(12) United States Patent
Leduc

(10) Patent No.: US 6,639,611 B1
(45) Date of Patent: Oct. 28, 2003

(54) SYSTEM AND METHOD FOR EFFICIENT LAYOUT OF A DISPLAY TABLE

(75) Inventor: Kevin Leduc, Ottawa (CA)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/461,896

(22) Filed: Dec. 15, 1999

(51) Int. Cl.$^7$ ................................................ G09G 5/00
(52) U.S. Cl. ........................................ 345/764; 715/517
(58) Field of Search .............................. 345/764, 700, 345/788, 760; 707/509–510, 503–504, 513, 517–524; 715/509–510, 503–504, 513, 517–524

(56) References Cited

U.S. PATENT DOCUMENTS

| | | | | |
|---|---|---|---|---|
| 5,289,571 A | * | 2/1994 | Harada et al. | 345/443 |
| 5,379,372 A | * | 1/1995 | Wu | 707/506 |
| 5,425,138 A | | 6/1995 | Kumakawa | |
| 5,588,099 A | * | 12/1996 | Mogilevsky et al. | 707/508 |
| 5,768,606 A | * | 6/1998 | Sharp | 707/509 |
| 5,808,914 A | | 9/1998 | Shin et al. | |
| 5,812,131 A | * | 9/1998 | Bertram | 345/798 |
| 5,835,916 A | * | 11/1998 | Inaki et al. | 707/509 |
| 5,845,299 A | * | 12/1998 | Arora et al. | 345/760 |
| 5,893,127 A | * | 4/1999 | Tyan et al. | 382/176 |
| 6,023,714 A | * | 2/2000 | Hill et al. | 345/760 |
| 6,044,383 A | * | 3/2000 | Suzuki et al. | 707/504 |
| 6,055,550 A | * | 4/2000 | Wallack | 707/508 |
| 6,088,708 A | * | 7/2000 | Burch et al. | 707/509 |
| 6,300,947 B1 | * | 10/2001 | Kanevsky | 345/804 |
| 6,311,196 B1 | * | 10/2001 | Arora et al. | 345/764 |
| 6,326,970 B1 | * | 12/2001 | Mott et al. | 345/667 |
| 6,504,544 B1 | * | 1/2003 | Hollingsworth et al. | 345/467 |

FOREIGN PATENT DOCUMENTS

EP    0 440 496    8/1991

OTHER PUBLICATIONS

Raggett, "HTML Tables," May 1996, pp. 1–23.
*Wireless Application Protocol, Wireless Markup Language Specification*, Apr. 1998, Wireless Application Protocol Forum, Ltd., pp. 1–59.

* cited by examiner

*Primary Examiner*—Sy D. Luu
(74) *Attorney, Agent, or Firm*—Meyertons Hood Kivlin Kowert & Goetzel, P.C.; B. Noël Kivlin

(57) ABSTRACT

A system and method for efficient layout of a display table. Given a description of a table, such as a markup language description, the table description may be parsed and data structures representing the table description may be created. The table description data structures may then be "inspected", in order to determine the possible size of the table. Once the table has been inspected, the table may then be "apportioned", based on the results of the inspection step. That is, final dimensions may be assigned to the table. The table coordinates may then be "normalized", which may involve converting relative table coordinates into absolute coordinates. Table layout optimizations are described, e.g., in order to efficiently handle various aspects of table layout, such as table cells that span multiple columns or rows, table cells that include nested tables, etc. Thus, the table layout method described herein may be well-suited for use in an environment in which software optimizations are necessary or desirable, such as within a resource-constrained small footprint device.

36 Claims, 14 Drawing Sheets

| Row 0, Column 0 | Row 0, Column 1 | Row 0, Column 2 | |
|---|---|---|---|
| Row 1, Column 0 | Row 1, Column 1 | Row 1, Column 2<br>Nested table: | |
| | | Row 0, Column 0 | Row 0, Column 1 |
| | | Row 1, Column 0 | Row 1, Column 1 |
| Row 2, Column 0 | Row 2, Column 1 | Row 2, Column 2 | |

Device Display

| Row 0, Column 0 | Row 0, Column 1 | Row 0, Column 2 | |
|---|---|---|---|
| Row 1, Column 0 | Row 1, Column 1 | Row 1, Column 2<br>Nested table: | |
| | | Row 0, Column 0 | Row 0, Column 1 |
| | | Row 1, Column 0 | Row 1, Column 1 |
| Row 2, Column 0 | Row 2, Column 1 | Row 2, Column 2 | |

Device Display

*Fig. 12*

SYSTEM AND METHOD FOR EFFICIENT LAYOUT OF A DISPLAY TABLE

BACKGROUND OF THE INVENTION

1. Field of the Invention

The present invention relates to the field of display tables, such as HTML tables. More particularly, the invention relates to a system and method for efficient layout of a display table.

2. Description of the Related Art

Display tables are commonly used in many types of software applications. A display table may comprise rows and columns that define cells. Each of the cells may comprise some type of cell content. For example, many current web page documents include hypertext markup language (HTML) tables with cells that may include content such as text or images. As another example, word processor applications often enable authors to create tables for display in a document.

Display tables are typically described in some format that a software application must process in order to display the table correctly. For example, a markup language table may be described in a text format by various markup language tags that are processed and used to create data structures representing the table.

When processing a table description, many factors may be involved in correctly determining the dimensions for the rows and columns of the table, such as the desired dimensions indicated by the table author, the available display device area for displaying the table, the minimum cell size necessary to display the content of each cell, the number of columns or rows spanned by particular cells, the determination of row and column dimensions for any nested tables included in the table, etc. The process of determining the row and column dimensions for a table, assigning coordinates to the table, and positioning the cell content within each cell of the table is referred to herein as "laying out" the table.

In many cases, it is of course not only desirable to correctly lay out display tables, but to do so efficiently. Designing an efficient table layout method may be difficult. One source of difficulty lies in dealing with nested tables, i.e., a table with one or more cells comprising another table. If the table layout method is not designed carefully, the method may scale exponentially with increasing table nesting complexity.

Although some current table layout methods do succeed in avoiding exponential scaling with increased nesting complexity, it appears, based on the results of benchmark tests, that they do not perform other possible optimizations. Although thorough optimization of a table layout method may not be very important in some contexts or environments, in others it can be important.

Small footprint devices offer one example of an environment in which it is often necessary or desirable to pay particular attention to software efficiency. The field of "smart" small footprint devices is growing and changing rapidly. Small footprint devices include handheld computers, personal data assistants (PDAs), cellular phones, global positioning system (GPS) receivers, game consoles, set-top boxes, and many more such devices. Small footprint devices are becoming increasingly powerful and enabled to run software applications or services historically associated with general computing devices, such as desktop computers.

Small footprint devices may have very strong resource constraints, such as the amount of memory and the processing power available. Thus, it is often necessary or desirable to design optimized software that performs well in the environment of a small footprint device. Providing an efficient layout method for a display table is one example of a software optimization that may significantly benefit small footprint device users. For example, many small footprint devices are now able to run web browser applications, which often process web pages comprising markup language tables, such as HTML tables, as described above.

SUMMARY OF THE INVENTION

The problems outlined above may in large part be solved by a system and method for efficient layout of a display table, as described herein. Given a description of a table, such as a markup language description, the table description may be parsed and data structures representing the table description may be created.

The table description data structures may then be "inspected", in order to determine the possible size of the table. The process of table inspection may involve determining the minimum and maximum possible widths for each table cell, and then determining the minimum and maximum possible widths for each table column, based on the individual cell values. The minimum and maximum possible table widths may then be calculated from the possible table column widths.

Once the table has been inspected, the table may then be "apportioned", based on the results of the inspection step. That is, final dimensions may be assigned to the table. The process of table apportioning may involve assigning a width to each table column and a height to each table row.

The table coordinates may then be "normalized", which may involve converting relative table coordinates into absolute coordinates.

Table layout optimizations are described, e.g., in order to efficiently handle various aspects of table layout, such as table cells that span multiple columns or rows, table cells that include nested tables, etc. Thus, the table layout method described herein may be well-suited for use in an environment in which software optimizations are necessary or desirable, such as within a resource-constrained small footprint device.

BRIEF DESCRIPTION OF THE DRAWINGS

Other objects and advantages of the invention will become apparent upon reading the following detailed description and upon reference to the accompanying drawings in which:

FIG. 12 is an example of a nested HTML table;

Figure 1:
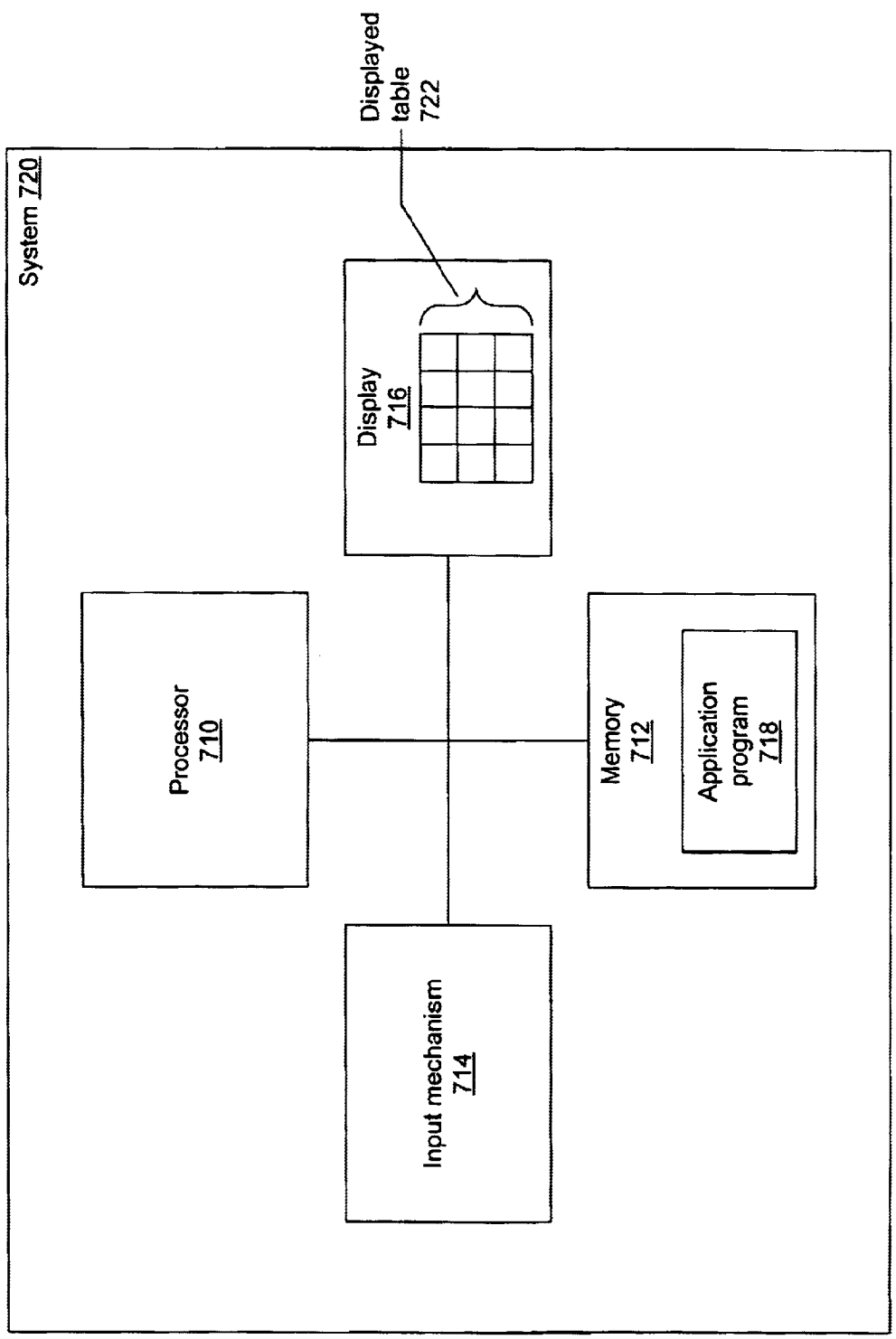
FIG. 1 is a block diagram illustrating one embodiment of a system supporting a method for efficiently laying out a display table.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1

Exemplary System

FIG. 1 is a block diagram illustrating one embodiment of a system 720 supporting a method for efficiently laying out a display table. The system 720 may be employed in any of various types of computing devices, such as desktop computers or workstations, small footprint devices, etc.

As shown in FIG. 1, the system 720 may include a processor 710. The processor 710 may be any of various types, including an x86 processor, e.g., a Pentium class, a PowerPC processor, a CPU from the SPARC family of RISC processors, as well as others. In various embodiments, such as an embodiment in which the system 720 illustrates a small footprint device, the processor 710 may be a less powerful processor than those listed above or may be a processor developed specifically for a small footprint device, such as a digital signal processor (DSP). The processor 710 may have various clock speeds, including clock speeds similar to those found in desktop computer-class processors, as well as lower speeds such as 16 MHz.

The system 720 also includes a memory 712 coupled to the processor 710. The memory 712 may comprise any of various types of memory, including DRAM, SRAM, EDO RAM, etc., or a non-volatile memory such as a magnetic media, e.g., a hard drive, or optical storage. The memory 712 may comprise other types of memory as well, or combinations thereof. For an embodiment in which the system 720 illustrates a small footprint device, the memory 712 may have a very small storage capacity compared to a typical desktop computer system.

As shown in FIG. 1, the memory 712 may store an application program 718. The application program 718 may be any of various types of application programs that utilize display tables. For example the application program 718 may be a web browser application that displays markup language tables, such as HTML or XML-derived tables, the application program 718 may be a word processor program that displays tables described in word processor documents, etc. The application program may be configured to efficiently lay out display tables, as described below.

As shown in FIG. 1, the system 720 may also comprise a display 716. The display 716 may be any of various types, such as an LCD (liquid crystal display), a CRT (cathode ray tube) display, etc. It is noted that the display for a typical small footprint device, such as a smart cellular phone, may be small compared to the display of a desktop computer system. FIG. 1 illustrates a graphical representation of a tabl 722 displayed on the display 716. The processor 710 executing code and data from the memory 712 provides a means for laying out and displaying the table.

As shown in FIG. 1, the system 720 may also comprise an input mechanism 714. The input mechanism 714 may be any of various types, as appropriate for a particular system. For example, the input mechanism may be a keyboard, mouse, trackball, touch pen, microphone, modem, infrared receiver, etc.

As noted above, in various embodiments, the system 720 may be illustrative of a small footprint device. As used herein, a small footprint device is a hardware device comprising computing resources such as a processor and a system memory, but having significantly greater constraints on one or more of these resources than a typical desktop computer has. For example, a typical small footprint device may have two megabytes of memory or less, whereas a typical desktop system may have 64 megabytes or more. Also a typical small footprint device may have significantly less processing power than a typical desktop computing system, either in terms of processor type, or processor speed, or both. For example, a particular personal data assistant device may have a 16 MHz processor, whereas a typical desktop system may have a processor speed of 100 MHz or higher. Also, a typical small footprint device may have a display size significantly smaller than the display screen of a desktop computing system. For example, the display screen of a handheld computer is typically small compared to the display screen of a desktop monitor. It is noted that the specific numbers given above are exemplary only and are used for comparison purposes.

Small footprint devices may also have constraints on other resource types compared to typical desktop computing systems, besides the memory, processor, and display size resources described above. For example, a typical small footprint device may not have a hard disk, may not have a network connection, or may have an intermittent network connection, or may have a wireless network connection, etc.

Many small footprint devices are portable and/or are small compared to desktop computers, but are not necessarily so. Also, many small footprint devices are primarily or exclusively battery-operated. Also, small footprint devices may typically have a more limited or narrow range of usage possibilities than a typical desktop computing system. Thus, in various embodiments, the system illustrated in FIG. 1 is illustrative of, but is not limited to, any one of the following: handheld computers, wearable devices (e.g., wristwatch computers), personal data assistants (PDAs), "smart" cellular telephones, set-top boxes, game consoles, global positioning system (GPS) units, electronic textbook devices, etc. Since new classes of consumer devices are rapidly emerging, it is not possible to provide an exhaustive list of small footprint devices. However, the term "small footprint device" is intended to include such devices as may reasonably be included within the spirit and scope of the term as described above.

It is noted that in various embodiments the system and method described herein may also be employed in a general-purpose computer system, such as a desktop PC or mainframe computer.

FIG. 2

Table Layout Overview

Figure 2:
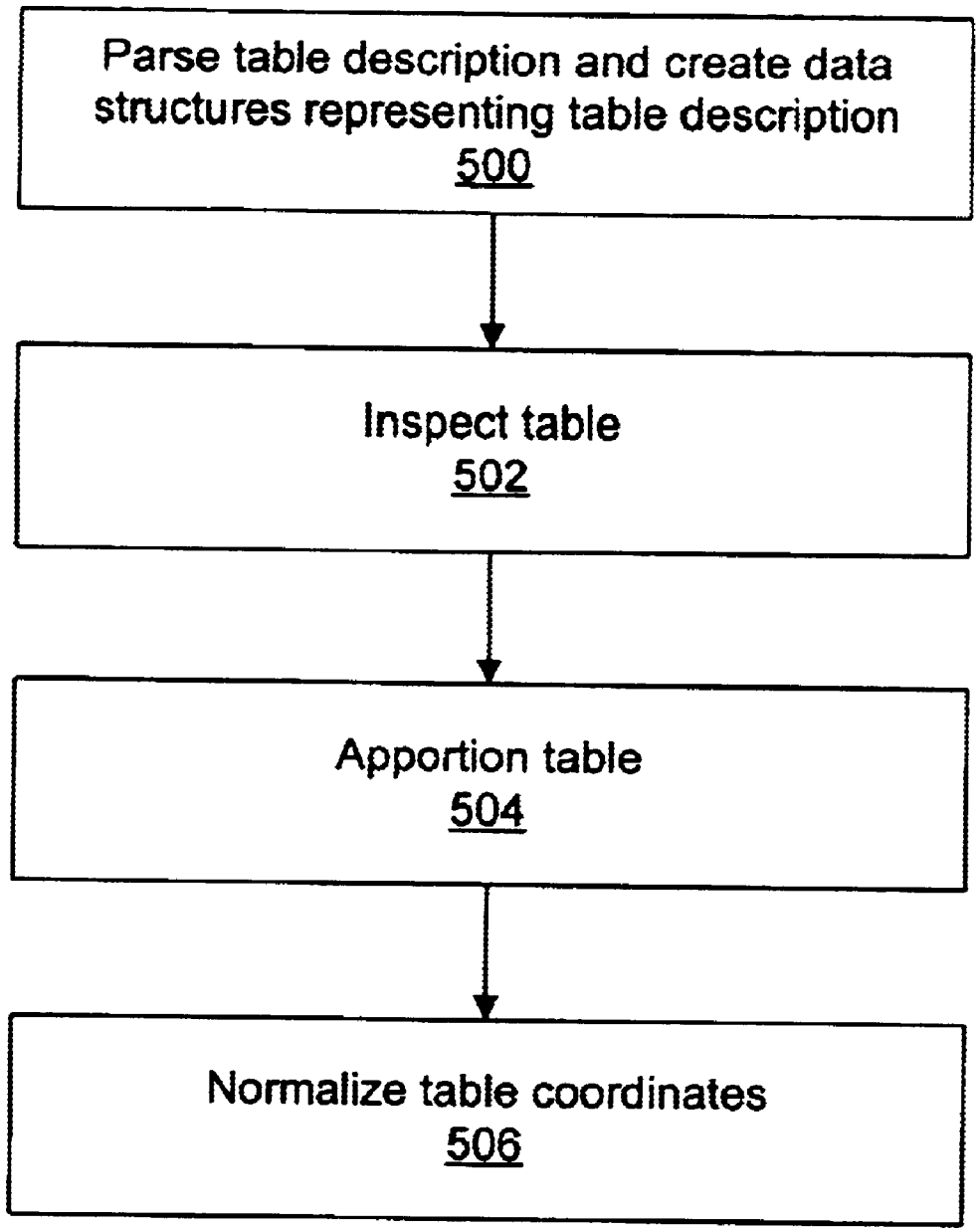
FIG. 2 is a flowchart diagram illustrating an overview of one embodiment of a layout method for a display table.

FIG. 2 is a flowchart diagram illustrating an overview of one embodiment of a layout method for a display table.

Display tables may be described in any of various ways, as appropriate for a particular type of table or application. For example, a markup language table, such as an HTML table, may be described in a textual format, via the use of markup language tags. Other types of display tables may be described differently, e.g., in a binary format. Depending on the particular type of table or application, the display table description may include various types of information regarding the table, such as row and column definitions, the preferred size of the table, the content for each table cell, etc.

In step 500, the display table description may be parsed and data structures representing the table description may be created and stored in system memory. The table description data structures may be created and stored using any of various well-known methods, as appropriate for a particular type of table or application. For example, a web browser application parsing an HTML table may create a set of objects related to each other as specified by the standard Document Object Model (DOM).

In step 502, the table data structures created in step 500 may be "inspected". As discussed above, various factors may affect layout of a display table, such as the desired, dimensions indicated by the table author, the available display device area for displaying the table, the minimum cell size necessary to display the content of each cell, the number of columns or rows spanned by particular cells, etc. Thus, display table layout involves a negotiation between determining the possible size of a table, based on minimum and maximum dimensions of table cells, and assigning final dimensions to the table rows and columns, based on the possible size of the table and the available display area for the table. Step 502, table inspection, involves determining the possible size of the table, and is discussed in detail below.

In step 504, the table may be "apportioned", based on the results of step 502. That is, final dimensions may be assigned to the table and to each of the table rows and columns. Step 504, table apportioning, is discussed in detail below.

In step 506, the table coordinates are "normalized". When laying out a cell, the final position of the cell is not yet known. Thus, each object in the cell is assigned a position relative to the top corner of the cell. Once a table's X,Y position has been set, these relative positions may be converted into absolute coordinates, which is referred to as normalization.

In order to maximize efficiency when processing nested tables, the normalization process may be delayed until the absolute coordinates of the outermost table are known. The outermost table may then be traversed recursively to normalize coordinates for any nested tables. By delaying the normalization process until the coordinates of the outermost table are known, repetition of the normalization process can be avoided.

FIG. 3

Table Inspection Overview

Figure 3:
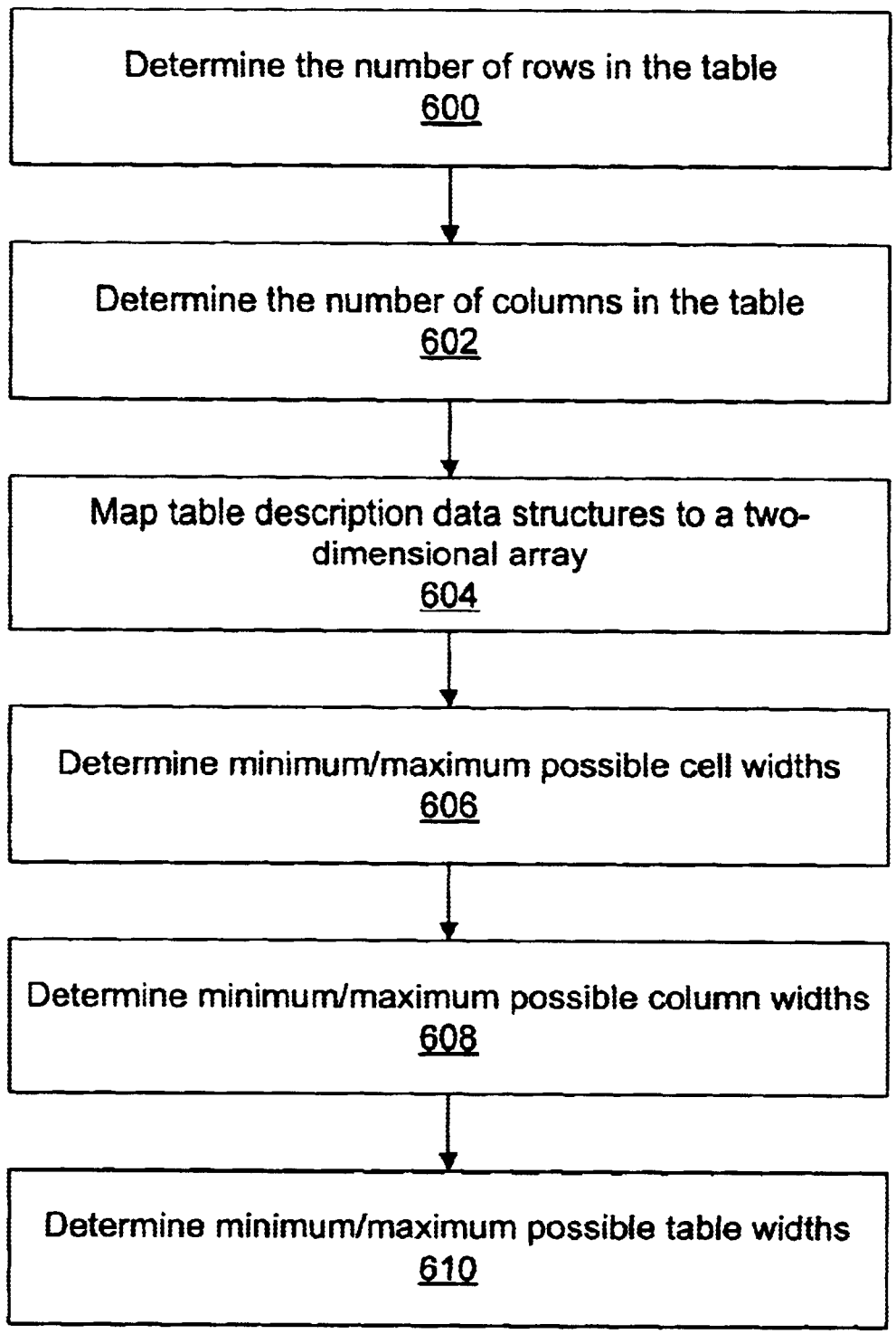
FIG. 3 is a flowchart diagram illustrating an overview of one embodiment of a process of performing display table inspection.

FIG. 3 is a flowchart diagram illustrating an overview of one embodiment of table inspection (step 502 of FIG. 2).

In step 600, the number of rows in the table is determined. In step 602, the number of columns in the table is determined. As discussed above with reference to step 500 of FIG. 2, the table may be parsed, and data structures representing the table description may be created. Each table description data structure may comprise information regarding which type of table element the data structure represents, such as a table row, a table cell, etc. Thus, steps 600 and 602 may simply involve traversing through the table description data structures and counting the number of table rows and columns. In an alternative embodiment, the number of table rows and columns may have been recorded as the table description was parsed, making steps 600 and 602 simply a matter of obtaining the recorded information.

In step 604, the data structures representing the table description are mapped to a table data structure suitable for efficiently accessing individual table cells, such as a two-dimensional array, using the number of rows and columns determined in steps 600 and 602 as the array dimensions. In another embodiment, the mapping of step 604 may be unnecessary if the data structures representing the table description already make it possible to efficiently traverse the table elements, quickly access individual cells, etc.

In step 606, the minimum and maximum possible widths for each table cell are determined. The minimum and maximum possible cell widths may be calculated in various ways. These calculations may depend on cell content. While certain types of cell content, such as images, may be associated with only one possible defined width, other types of cell content may be associated with various possible defined widths. For example, text may be displayable in various possible ways, such as being displayed in a single line, or being displayed in multiple lines in a wraparound fashion. As another example, a cell may include content such as a nested table having one or more cells containing text or other content displayable in different widths.

The calculations may also use information comprised in the table description itself. For example, an author of a table contained in a word processor document may set a table attribute which specifies the type of wrapping to apply to a cell. As another example, an HTML author may request that a cell be set to a certain width by using a WIDTH attribute.

However, in some embodiments, such information may be ignored when calculating the minimum cell widths. For example, HTML tables are typically designed with a desktop computer display screen in mind. However, these tables often do not display well on a small footprint device with a small display screen. When the present method is applied to render tables for a small footprint device, information such as WIDTH attributes may be ignored, and the minimum cell width may instead be based on cell content, which minimizes the display space consumed by a table.

As discussed above, table cells may comprise nested tables. In this case, in order to perform step 606, it may be necessary to first layout a cell's nested table(s), in order to determine the minimum and maximum possible widths for the inner tables. The inner table calculation may be performed recursively, or may be performed using well-known methods to avoid recursion, such as tree traversal algorithms.

In step 608, the minimum and maximum possible widths for each column in the table are determined, based on the minimum and maximum possible cell widths. Note that some types of tables, such as HTML tables, may allow cells to span multiple columns. Cells that span multiple columns may affect the widths of the spanned columns. Step 608 involves processing each cell of each column and tracking the minimum/maximum cell widths and also tracking which multiple-column-spanning cell (if there are any) has the largest maximum width. Step 608 is illustrated in more detail in FIGS. 4–6.

In step 610, the minimum and maximum possible widths for the display table are determined, based on the minimum and maximum possible column widths.

FIGS. 4–6

Determining Minimum/Maximum Possible Column Widths

Figure 4:
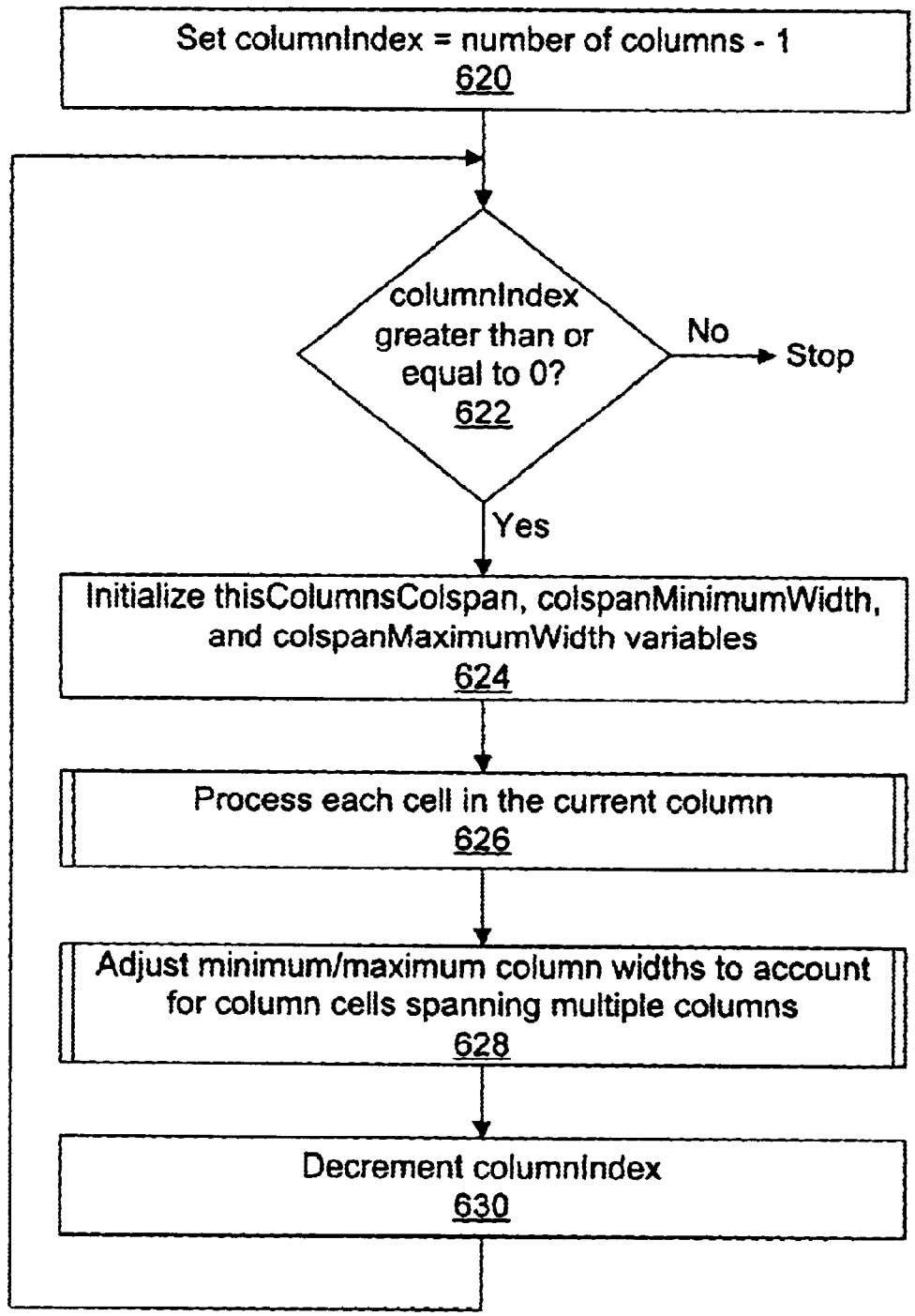
FIGS. 4–6 are flowchart diagrams illustrating one embodiment of a process of calculating the minimum and maximum possible column widths for a table.
Figure 5:
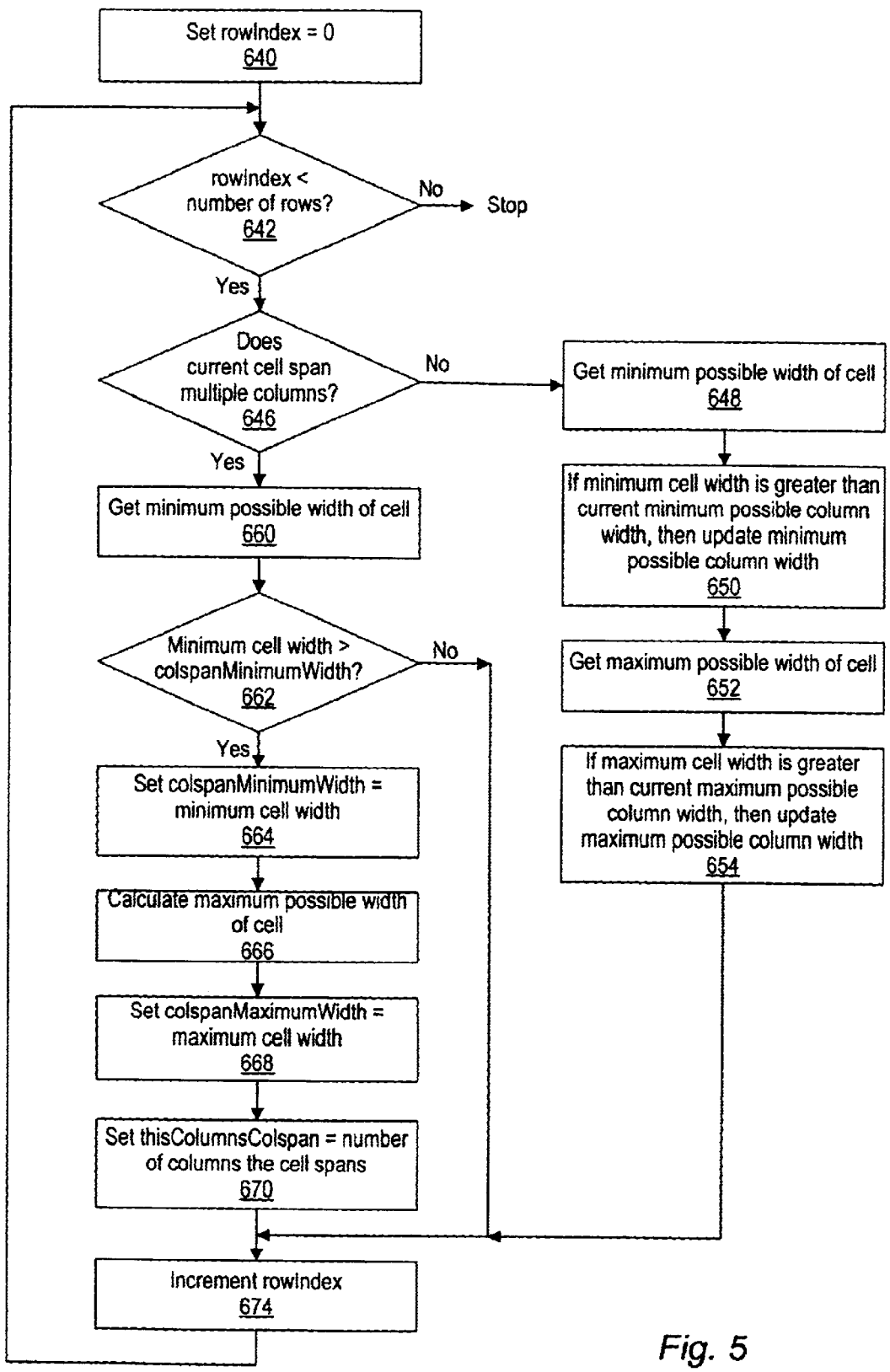
Figure 6:
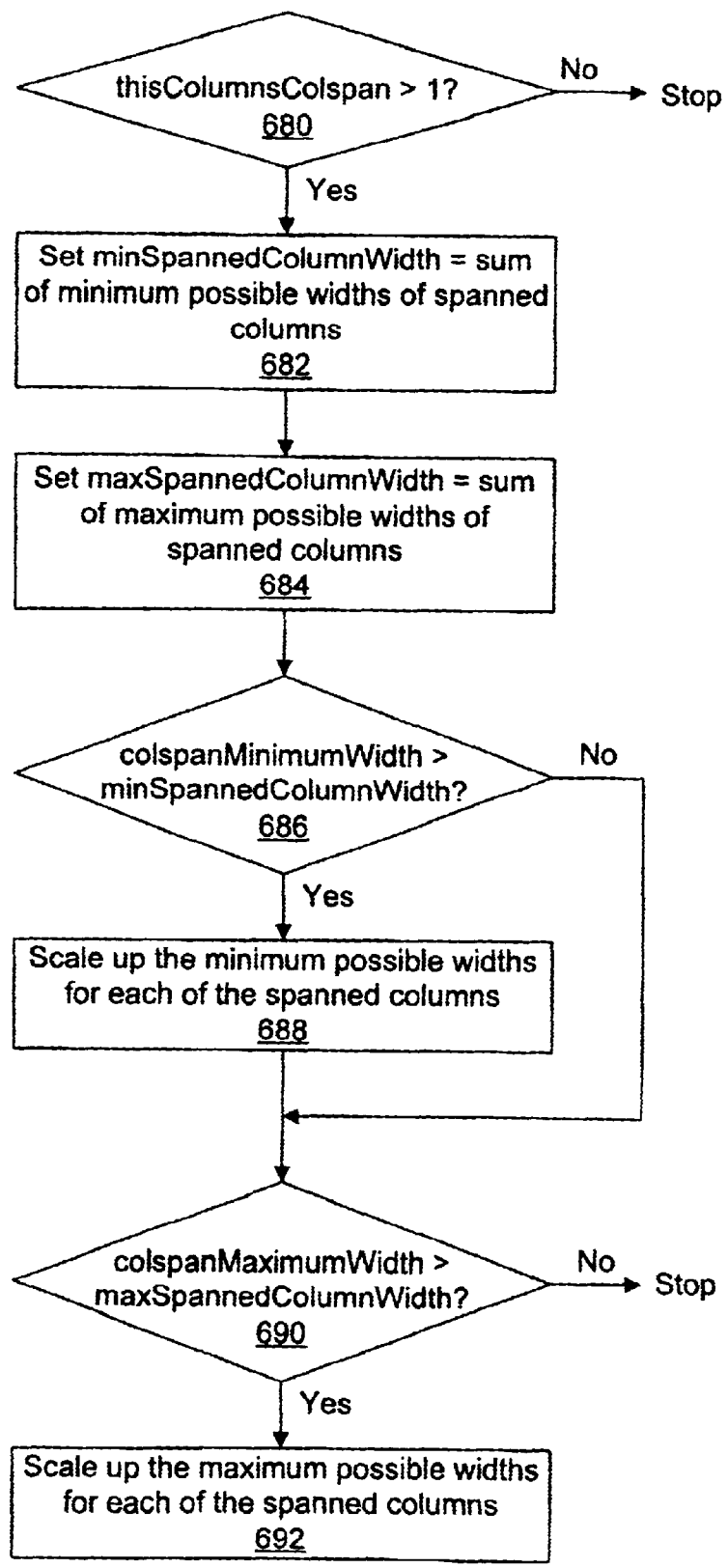

In step 608 of FIG. 4, the minimum and maximum possible widths for each column are determined. FIGS. 4–6 are flowchart diagrams illustrating one embodiment of step 608 in more detail.

As discussed above, some table cells may span multiple columns. The following HTML code gives an example of an HTML table comprising a multiple column-spanning cell:

```
<TABLE>
<TR><TD>Row 0, Column 0 <TD>Row 0, Column 1 <TD>Row 0, Column 2
<TR><TD>Row 1, Column 0 <TD COLSPAN="2">Row 1, Column 1
<TR><TD>Row 2, Column 0 <TD>Row 2, Column 1 <TD>Row 2, Column 2
</TABLE>
```

Figure 7:
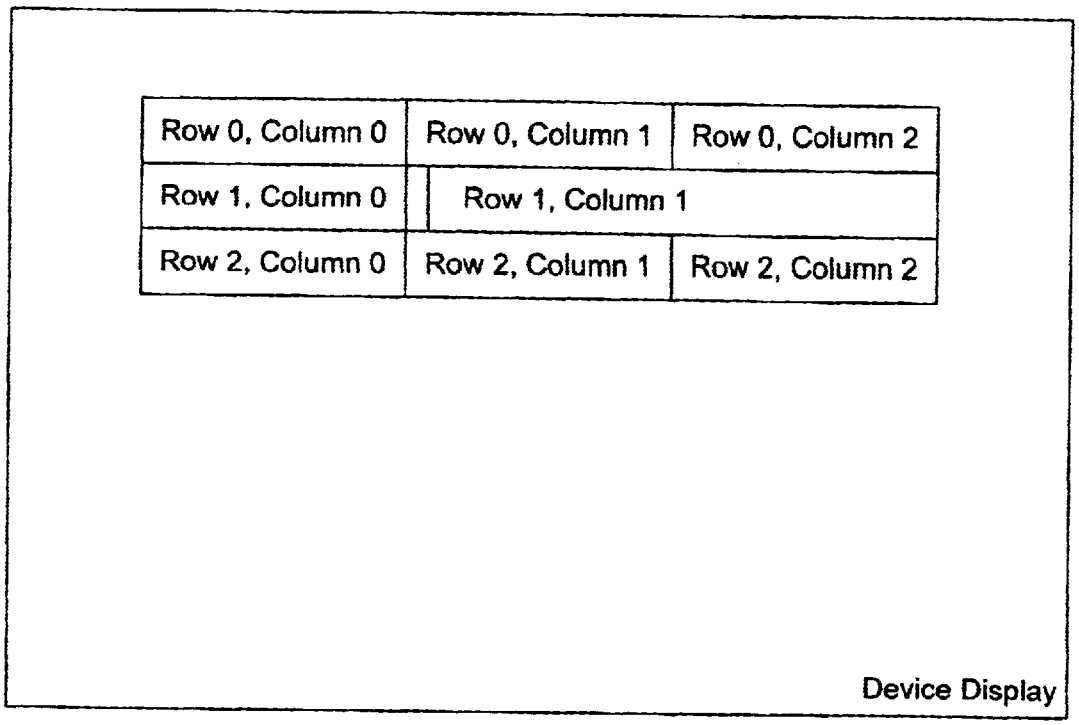
FIG. 7 is an example of an HTML table comprising a column-spanning cell.

FIG. 7 illustrates how this table may look when displayed. The cells of the table are labeled with their corresponding row and column numbers. The second cell of the middle row (row 1) of the table has a "COLSPAN" attribute which specifies that the cell spans two columns. Although this cell spans two columns, it is represented by a single entry in the table data structure created in step 604 of FIG. 3. In that table data structure, the cell is a member of the middle column, column 1, and there is no row 1 cell for the right-most column, column 2. Thus, in this example, a cell which spans multiple columns may be said to be a member of the left-most column which it spans.

In the steps illustrated in FIG. 4, each column of the table is traversed. For each column, all the cells of the column are processed in order to find the minimum/maximum possible cell widths. The column cell with the largest minimum possible width determines the minimum possible width for the column, and the column cell with the largest maximum possible width determines the maximum possible width for the column. Since any cells in the table which span multiple columns are members of the left-most column which they span, the columns are traversed in a right-to-left order. This allows the calculation of the minimum/maximum possible column widths to take place in a single pass through the table columns. If the columns were traversed in a left-to-right order then the minimum/maximum width values could not be determined for columns having a column-spanning cell on the first pass through, since the factors determining the width of the column-spanning cell would not yet be known.

A similar process as described above may be implemented for an embodiment in which multiple column-spanning cells are considered to be members of the right-most column which they span. In such an embodiment, the columns may be traversed in a left-to-right order instead of a right-to-left order.

To set up the right-to-left column traversal, the column index is set to the index of the right-most column in step 620 of FIG. 4. In step 622 the column index loop control variable is tested to make sure it is within range. If all the columns have been processed then the execution illustrated in FIG. 4 completes. Otherwise, in step 624 certain variables are initialized in preparation for an iteration through the column-processing loop. The use of these variables is described below. It is noted that the use of variables such as these represents one embodiment of the table layout method, and other embodiments are possible. For example, information may be recorded in the table data structure itself instead of in variables.

In step 626, each cell of the column specified by the column index is processed. Step 626 is illustrated in more detail in the flowchart diagram of FIG. 5. In step 640 of FIG. 5, the row index is set to 0. In step 642 the row index loop control variable is tested to make it is within range. If the index is out of range, then all the cells of the current column have been processed, and the execution illustrated in FIG. 5 completes.

Otherwise, in step 646, the current cell, i.e., the cell specified by the current columnIndex and rowIndex, is checked to see whether it spans multiple columns. If the cell does not span multiple columns, then execution proceeds to step 648. In step 648, the minimum possible width for the cell is obtained, using information stored in step 606 of FIG. 3. If this width is greater than the current minimum possible width recorded for the column, then the minimum possible column width is set to the minimum possible width for the cell. (The minimum possible width for each column is initialized to zero.) Steps 652 and 654 are similar to steps 648 and 650. The maximum possible width for the cell is obtained in step 652. The current maximum possible width for the column is updated to this value in step 654 if necessary. Execution proceeds from step 654 to step 674.

If it is determined in step 646 that the cell does span multiple columns, then execution proceeds to step 660. In step 660, the minimum possible width for the cell is obtained, using information stored in step 606 of FIG. 3. This step is identical to step 648. In step 662, the minimum cell width is compared to the colspanMinimumWidth variable. A column may have more than one cell which spans multiple columns. The colspanMinimumWidth variable tracks the largest minimum width value of all these cells. If the minimum width value for the current cell is not greater than the colspanMinimumWidth value already recorded, then the current cell is ignored, and execution proceeds to step 674. As described below, the colspanMinimumWidth variable is used to adjust the minimum widths of the columns spanned by the cell, if necessary. For this adjustment, it is only necessary to track the largest minimum possible cell width of all the spanning cells.

If the minimum width value for the current cell is greater than the colspanMinimumWidth value already recorded, then the colspanMinimumWidth variable is updated in step 664. In step 666 the maximum possible width for the cell is calculated. In step 668 the colspanMaximumWidth variable is set to this maximum possible cell width. In step 670, the thisColumnsColspan variable is set to the number of columns spanned by the cell. The use of the colspanMinimumWidth, colspanMaximumWidth, and thisColumnsColspan variables is discussed below for FIG. 6.

As shown in FIG. 5, step 674 is reached from step 654, step 662, or step 670. At this point, the cell referenced by the current column and row indices has been processed, and the next cell in the current column will be processed. Thus, the rowIndex variable is incremented, and execution loops back to step 642. From step 642, another loop iteration through steps 646–674 occurs, or the loop ends, as appropriate. Once the loop of FIG. 5 ends, step 626 of FIG. 4 is complete, and execution proceeds to step 628 of FIG. 4. At this point, the cells of the current column have been processed to determine the minimum/maximum possible widths for the column. As described previously, the colspanMinimumWidth and colspanMaximumWidth variables may be set in step 626. In step 628, these values are used to adjust the minimum and maximum possible column widths of columns spanned by a cell in the current column, if necessary. Step 628 is described in more detail below with reference to FIG. 6. Once step 628 is complete, the current column has been processed. The columnIndex loop control variable is decremented in step 630 so that it references the next column to the left in the table. From step 630 execution proceeds to step 622, where the loop ends if the column index is out of range, or another loop iteration is performed, as appropriate.

FIG. 6 is a flowchart diagram illustrating step 628 of FIG. 4 in more detail. The steps of FIG. 6 utilize the variables colspanMinimumWidth, colspanMaximumWidth, and thisColumnsColspan which were set while processing the current column in the steps of FIG. 5. As described above, information for only one of a column's multiple column-spanning cells is tracked (the one with the largest minimum possible width). This cell is referred to below as the "largest spanning cell".

The thisColumnsColspan variable indicates the number of columns spanned by the largest spanning cell. In step 680 the thisColumnsColspan variable is checked to see whether it is greater than 1. This variable is initialized to 1 in step 624 at the beginning of each iteration through the column-processing loop. If thisColumnsColspan is not greater than 1, then no cells spanning multiple columns were found in step 626, and execution returns to step 630 of FIG. 4. Otherwise, execution proceeds to step 682 of FIG. 6.

In step 682, the minSpannedColumnWidth variable is calculated by summing up the minimum possible width values recorded for each of the columns spanned by the largest spanning cell. Since the table columns are traversed in a right-to-left order, each of these values is already known. In step 684 the maxSpannedColumnWidth variable is calculated by summing up the maximum possible width values recorded for each of the columns spanned by the largest spanning cell.

In step 686, the colspanMinimumWidth variable is compared to the minSpannedColumnWidth variable. If colspanMinimumWidth is less than or equal to minSpannedColumnWidth, then the minimum possible widths of the spanned columns are already sufficiently large to hold the minimum possible width of the largest spanning cell. In this case, execution proceeds to step 690. However, if colspanMinimumWidth is greater than minSpannedColumnWidth, then one or more of the minimum possible width values of the spanned columns must be adjusted in order to hold the largest spanning cell. As shown in step 688, in one embodiment, a factor based on colspanMinimumWidth—minSpannedColumnWidth may be calculated, and the minimum possible width value for each of the spanned columns may be scaled upward. Other adjustment methods may be used in other embodiments.

Steps 690 and 692 are similar to steps 686 and 688. If colspanMaximumWidth is greater than maxSpannedColumnWidth, then one or more of the maximum possible width values of the spanned columns are increased in step 692 so that the maximum possible column widths are large enough to hold the maximum possible width of the largest spanning cell.

The processes described above of course represent one embodiment, and various steps may be added, omitted, combined, altered, performed in different orders, etc. For example, the processes are discussed in terms of initializing an index to 0, etc. However, any of various well-known techniques for properly controlling iteration may be used.

FIG. 8

Table Apportioning Overview

Figure 8:
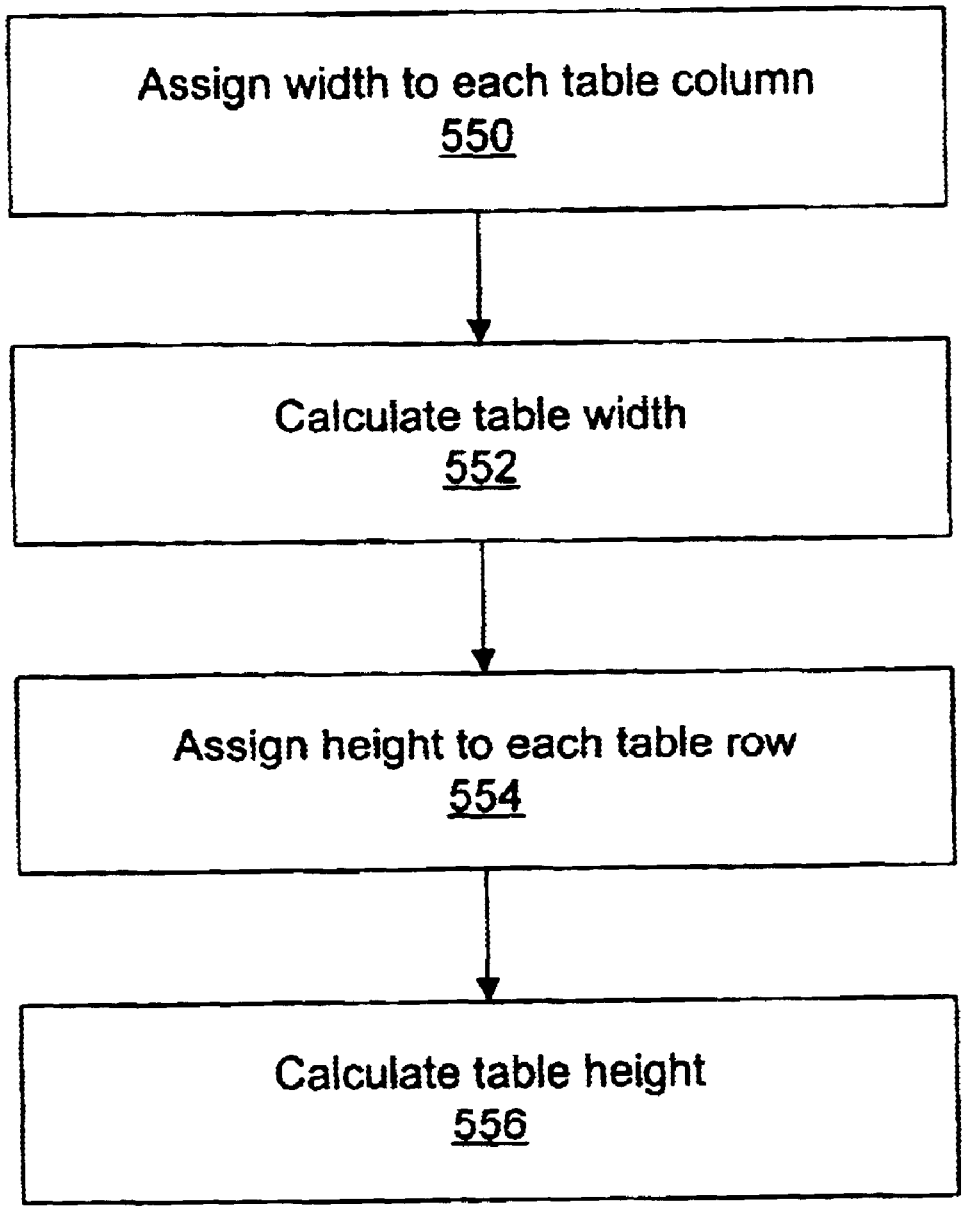
FIG. 8 is a flowchart diagram illustrating an overview of one embodiment of a process of performing display table apportioning.

As described above, once a table has been inspected, it can be apportioned, i.e., final dimensions may be assigned to the table and to each of the table rows and columns. FIG. 8 is a flowchart diagram illustrating an overview of one embodiment of table apportioning (step 504 of FIG. 2).

In step 550, the minimum/maximum possible column widths determined during the table inspection process are considered along with the available space for the table in order to assign a width to each table column. Step 550 is illustrated in more detail in FIG. 9.

In step 552, the width of the table is calculated, e.g., by summing up the column widths assigned in step 550.

Cell heights may be somewhat determined by cell widths. Few constraints are placed on cell height, since it is usually more visually appealing to display a table of a width that fits on a display screen, rather than to control the cell heights and have the table width overflow.

Thus, once the table columns have been assigned widths in step 550, a height may be assigned to each table row in step 554. Step 554 is illustrated in more detail in FIGS. 10 and 12.

In step 556, the height of the table is calculated, e.g., by summing up the row heights assigned in step 554.

FIG. 9

Assigning Table Column Widths

Figure 9:
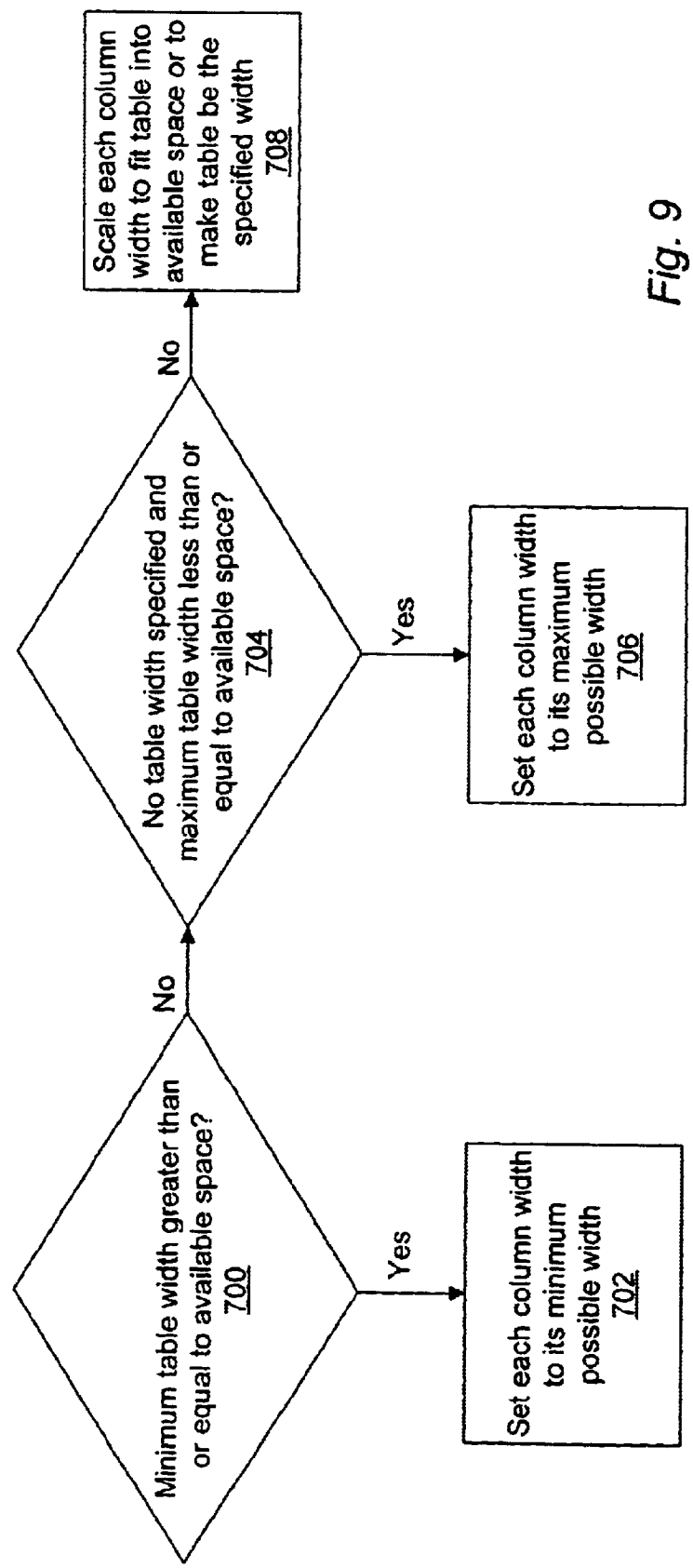
FIG. 9 is a flowchart diagram illustrating one embodiment of a process of assigning a width to each column of a display table.

FIG. 9 is a flowchart diagram illustrating step 550 of FIG. 8 in more detail. As shown in FIG. 9, there are three basic cases. In step 700 the minimum table width is calculated and compared to the available display space for the table. The minimum table width may be calculated by summing the minimum possible column widths for each column in the table, which were determined during the table inspection process described above. The available display space may be determined in various ways. For example, the available space value may be passed as a parameter to a table apportioning method or function. If the minimum table width is too large to fit into the available display space, i.e., the table width must overflow the available display space, then the minimum table width is used, and in step 702 the final column width for each column is set to its minimum possible value.

If the minimum table width is small enough to fit into the available space, then execution proceeds to step 704. If no preferred width for the table was specified, then the maximum table width is calculated. Otherwise, execution proceeds to step 708. The maximum table width may be calculated by summing the maximum possible column widths for each column in the table. If the maximum table value is small enough to fit into the available space, then the maximum table width is used, and in step 706 the final column width for each column is set to its maximum value.

If neither of the conditions in step 700 or 704 are met, then the table columns are scaled to make the table width be a particular value in step 708. If a preferred width for the table is specified, then the columns are scaled to match this preferred table width value. If no preferred table width is specified and the maximum table width is too large for the available space, then the columns are scaled to match the available space value. Any of various heuristics or algorithms may be applied for the scaling. For example, each column may be scaled with an equation such as:

$$colWidth = minColWidth + ((maxColWidth - minColWidth) * (availableSpace - minTableWidth) / (maxTableWidth - minTableWidth))$$

Other scaling methods may be applied in other embodiments. For example, individual scaling factors may be applied to different columns, depending on each column's content.

Figure 10:
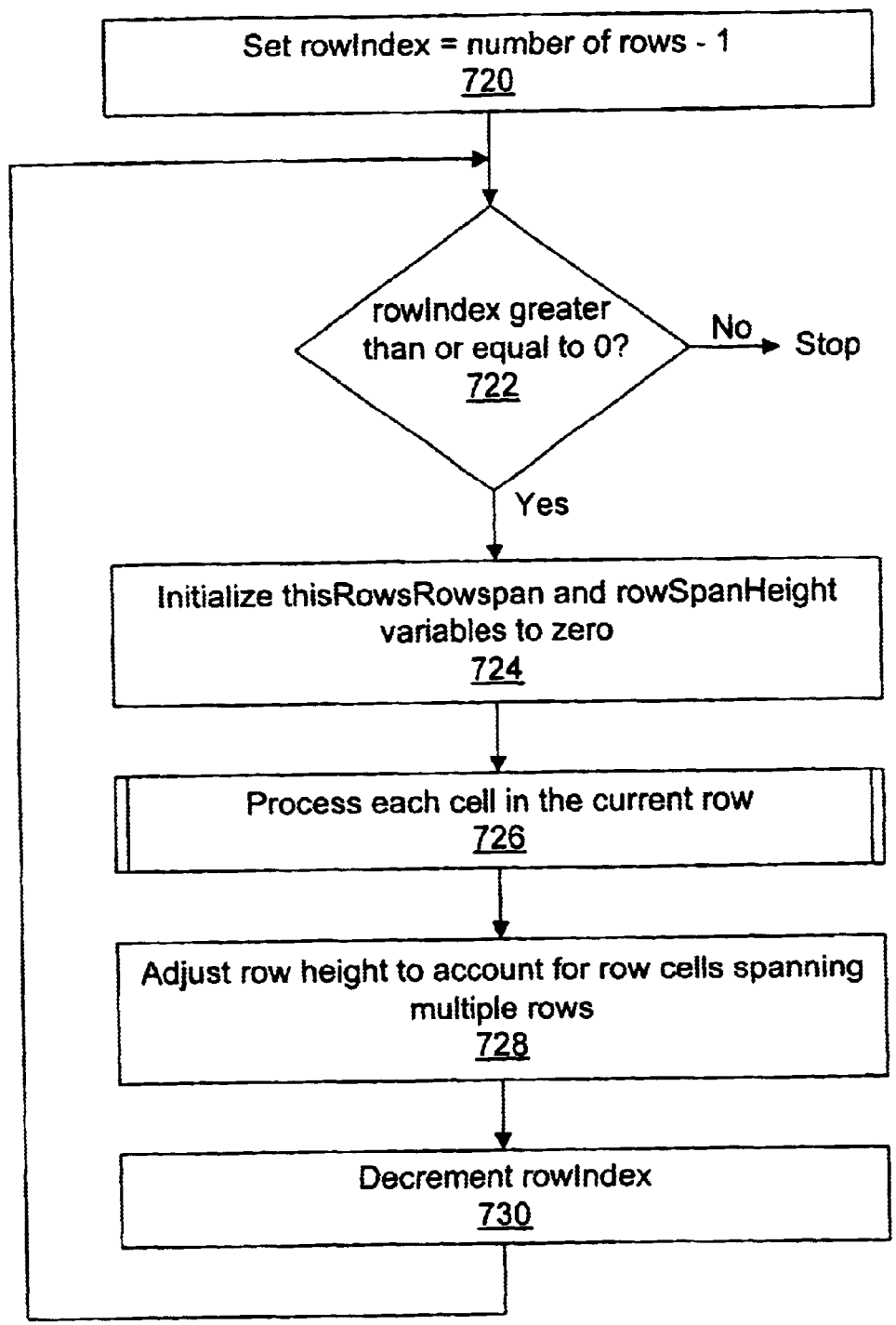
FIGS. 10 and 11 are flowchart diagrams illustrating one embodiment of a process of a height to each row of a display table.
Figure 11:
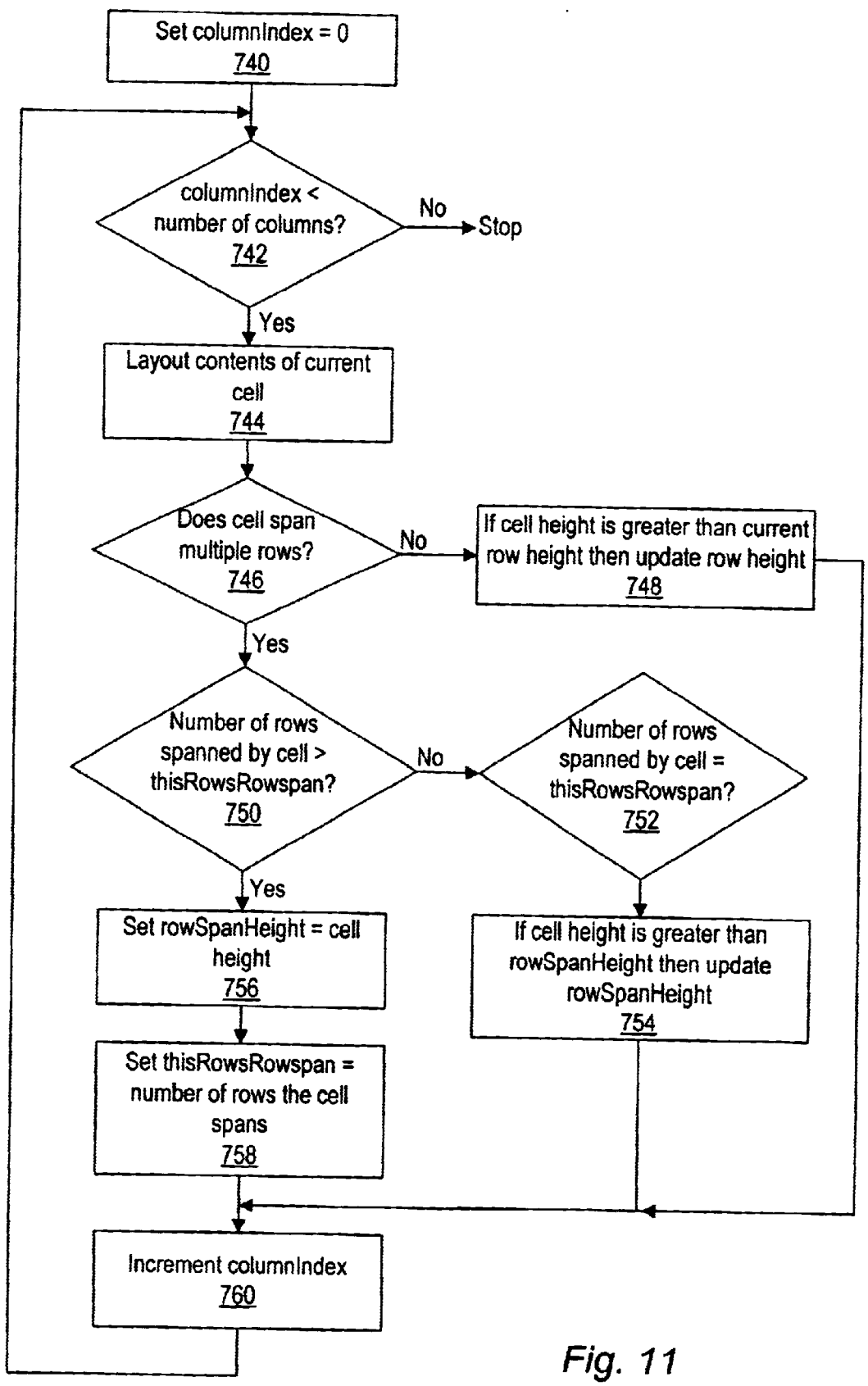

FIGS. 10 and 11

Assigning Table Row Heights

In step 554 of FIG. 8, a height is assigned to each table row. FIGS. 10 and 11 are flowchart diagrams illustrating step 554 in detail.

Just as table cells may span multiple columns, they may also span multiple rows. The below description accounts for cells that span multiple rows by processing rows in a bottom-to-top order, for reasons similar to the right-to-left column processing order described above.

To set up the bottom-to-top row traversal, the row index is set to the index of the bottom-most column in step 720 of FIG. 10. In step 722 the row index loop control variable is tested to make it is within range. If all the rows have been processed then the execution illustrated in FIG. 10 completes. Otherwise, in step 724 certain variables are initialized in preparation for an iteration through the row-processing loop. The use of these variables is described below. It is noted that the use of variables such as these represents one embodiment of the table layout method, and other embodiments are possible. For example, information may be recorded in the table data structure itself instead of in variables.

In step 726 each cell of the row specified by the row index is processed. Step 726 is illustrated in more detail in the flowchart diagram of FIG. 11. In step 740 of FIG. 11, the column index is set to 0. In step 742 the column index loop control variable is tested to make sure it is within range. If the index is out of range, then all the cells of the current row have been processed, and the execution illustrated in FIG. 11 completes.

Otherwise, in step 744, the contents of the current cell, i.e., the cell referenced by the current row index and column index, are layed out. The cell contents are layed out according to the cell width, which is determined from the assigned column widths as described above. Once the cell contents are layed out, the height of the cell is known.

In step 746, the cell is checked to see whether it spans multiple rows. If the cell does not span multiple rows, then execution proceeds to step 748. In step 748, the cell height is compared to the current height recorded for the row. (The height for each row is initialized to zero.) If the cell height is greater than the row height, then the height of the current row is set to the cell height. Execution proceeds from step 748 to step 760.

If the current cell does span multiple rows then execution proceeds from step 746 to step 750. In step 750 the number of rows spanned by the current cell is compared to the thisRowsRowspan variable value. If the current cell spans more rows than the value of thisRowsRowspan, then execution proceeds to step 756, where the value of the rowSpanHeight variable is set to the height of the current cell. The rowSpanHeight variable indicates the maximum height spanned by a row-spanning cell of the current row. Execution proceeds from step 756 to step 758, where the thisRowsRowspan value is updated to the number of rows spanned by the current cell. Execution proceeds from step 758 to step 760.

In step 750, if the current cell does not span more rows than the value of thisRowsRowspan, then execution proceeds to step 752. In step 752, the number of rows spanned by the current cell is again compared to the thisRowsRowspan variable value. If the two values are equal, then in step 754 the current cell height is checked to see if it is greater than the current value of rowSpanHeight. If so, then rowSpanHeight is updated to the height of the current cell, and execution proceeds to step 760. If the number of rows spanned by the current cell is not equal to thisRowsRowspan in the comparison of step 752, then execution proceeds to step 760.

Once step 760 is reached from step 748, 752, or 754, the current cell has been processed to determine how its height or other characteristics, such as the number of rows it spans, affect the calculation of the height of the current row. In step 760, the column index is incremented to reference the next column in the row, and execution loops back to step 742. From step 742, another loop iteration may be performed, or if all of the row's cells have been processed, then the row processing illustrated in FIG. 11 for step 726 of FIG. 10 may end.

Once the cells of the current row have been processed in step 726, execution proceeds to step 728 of FIG. 10. In step 728, the heights of the rows spanned by the largest spanning cell of the current row may be adjusted, if necessary. The row heights of these rows may be summed. If this sum is less than the height of the largest spanning cell (indicated by the rowSpanHeight variable), then the row heights may be adjusted. As discussed above for column width adjustment, the row height adjustment may be performed using any of various methods.

Once any necessary row height adjustments are made in step 728, the row index is decremented in step 730 to refer to the next highest row in the table, and execution loops back to step 722. From step 722, another loop iteration may be performed, or the execution illustrated in the flowchart diagram of FIG. 10 may end if all the table rows have already been processed.

The processes described above of course represent one embodiment, and various steps may be added, omitted, combined, altered, performed in different orders, etc. For example, the processes are discussed in terms of initializing an index to 0, etc. However, any of various well-known techniques for properly controlling iteration may be used.

FIG. 12

Efficient Layout of Nested Display Tables

As noted previously, some types of tables allow table nesting. For example, HTML tables may be nested. The following HTML code shows an example of a nested HTML table:

```
<TABLE>
<TR><TD>Row 0, Column 0 <TD>Row 0, Column 1 <TD>Row 0, Column 2
<TR><TD>Row 1, Column 0 <TD>Row 1, Column 1 <TD>Row 1, Column 2
                                    <BR>Nested table:
                                    <TABLE BORDER="1">
                                    <TR><TD>Row 0, Column 0
                                        <TD>Row 0, Column 1
                                    <TR><TD>Row 1, Column 0
                                        <TD>Row 1, Column 1
                                    </TABLE>
<TR><TD>Row 2, Column 0 <TD>Row 2, Column 1 <TD>Row 2, Column 2
</TABLE>
```

FIG. 12 illustrates what this table may look like when displayed.

In many cases, it may be desirable for a display table layout method to efficiently handle nested tables. For example, nested HTML tables are commonly found in web pages. Maximizing layout performance improvement may be especially important in laying out tables for small footprint devices, since these devices may have very little processing power. Also, the situations and environments in which these devices are used may make it especially important to layout tables quickly. For example, a user of a web browser application running in a cellular phone may need to quickly view a web page including nested tables in order to obtain an important phone number needed for an immediate situation, whereas a desktop computer user may typically browse the web in a more leisurely manner.

As discussed above, when a table description is parsed, data structures representing the table description may be created and stored in system memory. In one embodiment, the table description may be stored as objects comprising methods such as Inspect( ), Apportion( ), Normalize( ), etc. that correspond to the processes described above. The display table layout method may traverse through the table, invoking these methods and controlling the recursion process to efficiently handle nested tables.

The following HTML code describes a simple HTML table with one cell:

```
<table>
<tr>
<td>cell data
</table>
```

Figure 13:
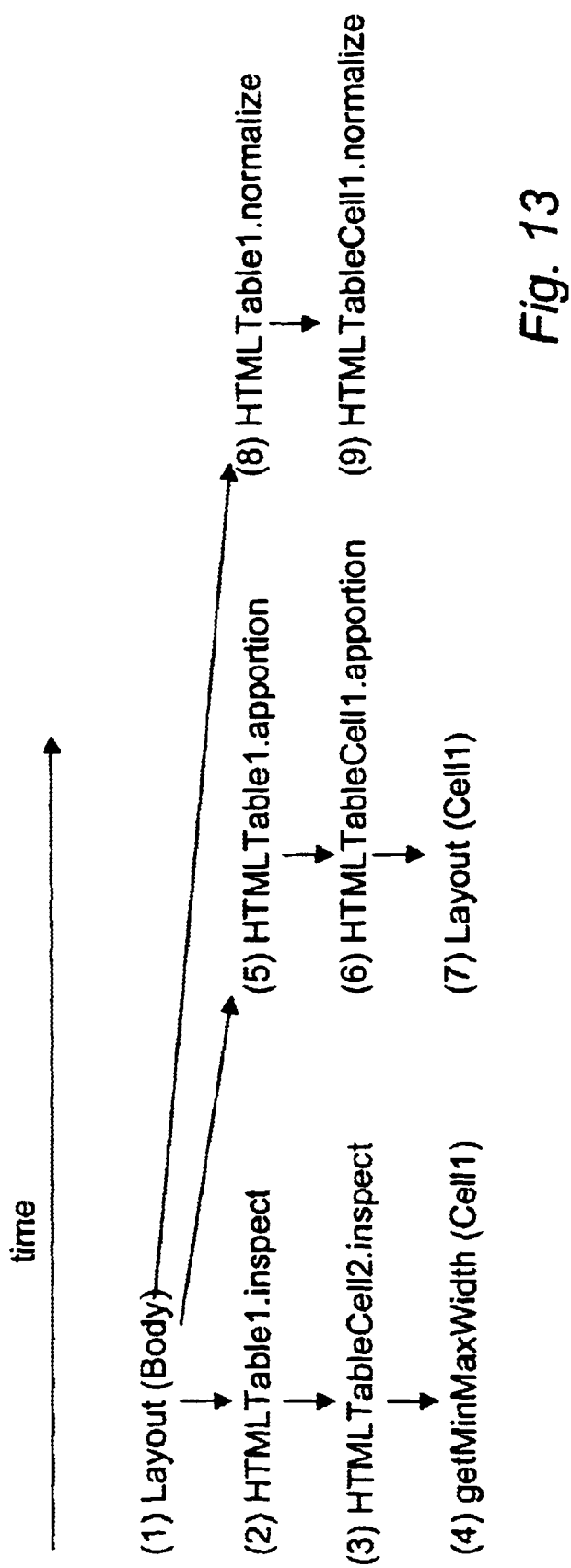
FIG. 13 illustrates an example of resulting method invocations when an HTML table with one cell is layed out.

FIG. 13 illustrates the resulting method invocations when this HTML table is processed. The method invocation trace shown in FIG. 13 follows the general process described above for laying out a display table. As shown, the display table is first inspected. Inspecting the table comprises inspecting each table cell. (In this example there is only one cell.) After the table is inspected, the table is then apportioned and normalized as described above and shown in FIG. 13.

The following HTML code describes a simple HTML table with one cell that includes a nested table with one cell:

```
<table>table1
<tr>
<td>cell <table> <tr><td>nested cell </table>
</table>
```

Figure 14:
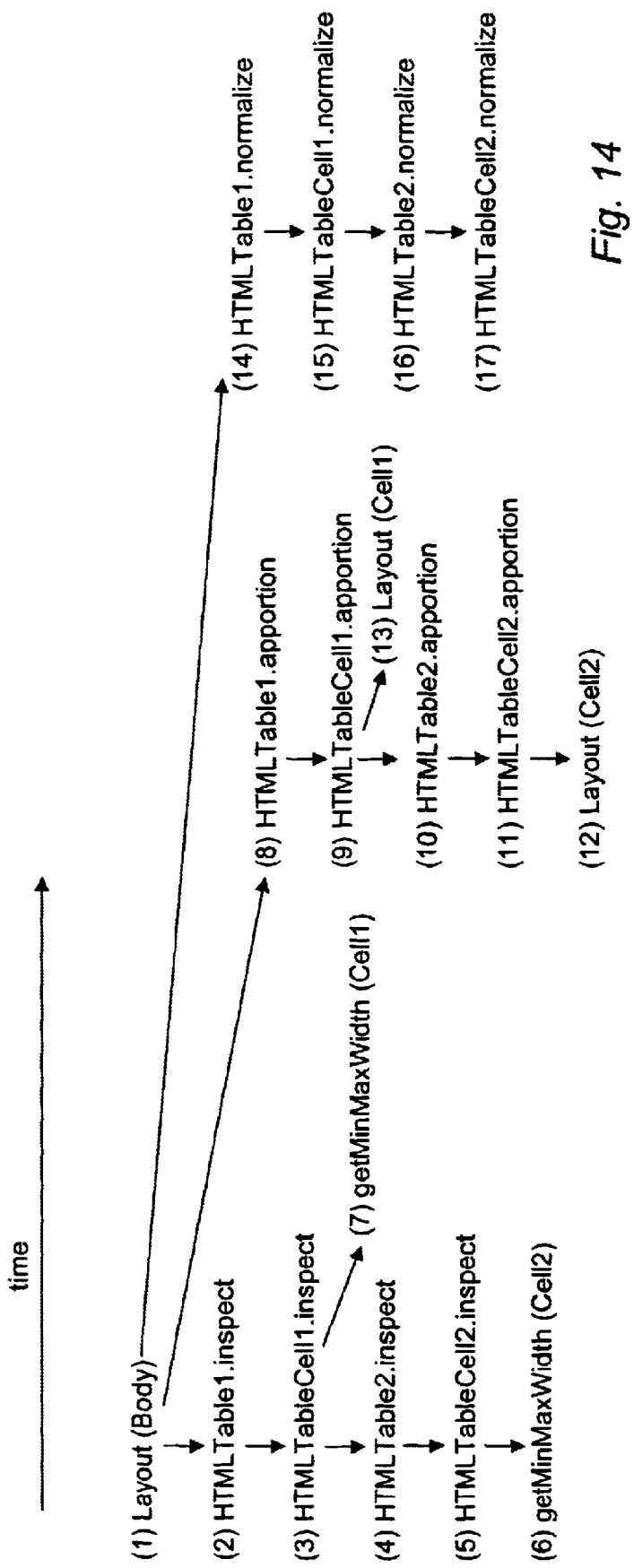
FIG. 14 illustrates an example of resulting method invocations when an HTML table with one cell that includes a nested table with one cell is layed out.

FIG. 14 illustrates the resulting method invocations when this HTML table is processed. The method invocation trace shown in FIG. 14 is similar to that in FIG. 13. However, as shown in FIG. 14, the inspection process for the cell of the outer table results in a second inspection process being initiated for the nested table included in the cell of the outer table. As shown in the figure, the nested table is inspected before minimum and maximum possible widths are assigned to the outer table cell. Similarly the apportioning process for the cell of the outer table results in a second apportioning process being initiated for the nested table included in the cell of the outer table.

The method invocation trace of FIG. 14 illustrates a single method invocation controlling the overall layout process for the outer table, i.e., the "Layout (Body)" method invocation. Note that when the cell of the outer table is layed out, (shown by the "Layout (Cell1)" method call) there is no such method invocation to layout the nested table included in the cell of the outer table. The nested table is identical to the table processed in FIG. 13. Thus, invoking the "Layout (Body)" method on the inner table would result in the FIG. 13 method invocation trace being included under the "Layout (Cell1)" method invocation in FIG. 14. As shown in FIG. 14, each of the FIG. 13 method invocations are already performed in the FIG. 14 method invocation trace. Thus, the layout method described herein is able to avoid the duplication of processing.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for efficiently laying out a display table specified by a display table description, wherein the display table comprises rows and columns, wherein the rows and columns define cells, the method comprising:

inspecting the display table description, wherein said inspecting comprises determining the minimum and maximum possible widths for each cell of the display table and using the minimum and maximum possible widths for each cell to determine the minimum and maximum possible widths for each column of the display table;

apportioning the display table, wherein said apportioning comprises using the minimum and maximum possible widths for each column of the display table to assign a width to each column of the display table and determining the resulting height of each table cell based on the assigned column widths, and using the cell height information to assign a height to each row of the display table.

2. The method of claim 1, further comprising:

normalizing the display table, wherein said normalizing comprises determining absolute table coordinates from relative table coordinates, wherein said apportioning the display table comprises determining the relative table coordinates.

3. The method of claim 1, wherein the display table comprises a plurality of rows and columns;

wherein the display table includes a cell that spans at least two columns.

4. The method of claim 1, wherein the display table includes a cell comprising a nested table.

5. The method of claim 1, wherein the display table is represented in memory as an object.

6. The method of claim 5, wherein the display table object comprises an "inspect" method and an "apportion" method;

wherein said inspecting the display table comprises invoking the "inspect" method of the display table object;

wherein said apportioning the display table comprises invoking the "apportion" method of the display table object.

7. The method of claim 1, wherein said determining the minimum and maximum possible widths for each cell of the display table is dependent upon a content of said each cell.

8. The method of claim 5, wherein the content in a particular cell includes text, and wherein the text is displayable in a first width and a second width.

9. The method of claim 8, wherein the first width and the second width represent the minimum and maximum possible widths for said particular cell.

10. The method of claim 1, wherein the display table description comprises a markup language table description.

11. The method of claim 1, wherein the display table description comprises a hypertext markup language (HTML) table description.

12. The method of claim 1, wherein s aid inspecting and said apportioning are implemented in a small footprint device.

13. A system comprising:

a processing unit;

memory coupled to the processing unit;

a program stored in the memory, wherein the program is executable to lay out a display table specified by a display table description, wherein the display table comprises rows and columns, wherein the rows and columns define cells;

wherein said laying out a display table comprises:

inspecting the display table description, wherein said inspecting comprises determining the minimum and maximum possible widths for each cell of the display table and using the minimum and maximum possible widths for each cell to determine the minimum and maximum possible widths for each column of the display table;

apportioning the display table, wherein said apportioning comprises using the minimum and maximum possible widths for each column of the display table to assign a width to each column of the display table and determining the resulting height of each table cell based on the assigned column widths, and using the cell height information to assign a height to each row of the display table.

14. The system of claim 13, wherein said laying out a display table further comprises:

normalizing the display table, wherein said normalizing comprises determining absolute table coordinates from relative table coordinates, wherein said apportioning the display table comprises determining the relative table coordinates.

15. The system of claim 13, wherein the display table comprises a plurality of rows and columns;

wherein the display table includes a cell that spans at least two columns.

16. The system of claim 13, wherein the display table includes a cell comprising a nested table.

17. The system of claim 13, wherein the display table is represented in the memory as an object.

18. The system of claim 17, wherein the display table object comprises an "inspect" method and an "apportion" method;

wherein said inspecting the display table comprises invoking the "inspect" method of the display table object;

wherein said apportioning the display table comprises invoking the "apportion" method of the display table object.

19. The system of claim 13, wherein said determining the minimum and maximum possible widths for each cell of the display table is dependent upon a content of said each cell.

20. The system of claim 19, wherein the content in a particular cell includes text, and wherein the text is displayable in a first width and a second width.

21. The system of claim 20, wherein the first width and the second width represent the minimum and maximum possible widths for said particular cell.

22. The system of claim 13, wherein the display table description comprises a markup language table description.

23. The system of claim 13, wherein the display table description comprises a hypertext markup language (HTML) table description.

24. The system of claim 13,
wherein the processing unit and memory are included within a small footprint device.

25. A memory medium comprising program instructions which implement laying out a display table specified by a display table description, wherein the display table comprises rows and columns, wherein the rows and columns define cells, wherein said laying out the display table comprises:

inspecting the display table description, wherein said inspecting comprises determining the minimum and maximum possible widths for each cell of the display table and using the minimum and maximum possible widths for each cell to determine the minimum and maximum possible widths for each column of the display table;

apportioning the display table, wherein said apportioning comprises using the minimum and maximum possible widths for each column of the display table to assign a width to each column of the display table and determining the resulting height of each table cell based on the assigned column widths, and using the cell height information to assign a height to each row of the display table.

26. The memory medium of claim 25, wherein said laying out the display table further comprises:

normalizing the display table, wherein said normalizing comprises determining absolute table coordinates from relative table coordinates, wherein said apportioning the display table comprises determining the relative table coordinates.

27. The memory medium of claim 25,
wherein the display table comprises a plurality of rows and columns;
wherein the display table includes a cell that spans at least two columns.

28. The memory medium of claim 25,
wherein the display table includes a cell comprising a nested table.

29. The memory medium of claim 25,
wherein the display table is represented in memory as an object.

30. The memory medium of claim 29,
wherein the display table object comprises an "inspect" method and an "apportion" method;
wherein said inspecting the display table comprises invoking the "inspect" method of the display table object;
wherein said apportioning the display table comprises invoking the "apportion" method of the display table object.

31. The memory medium of claim 25,
wherein said determining the minimum and maximum possible widths for each cell of the display table is dependent upon a content of said each cell.

32. The memory medium of claim 31,
wherein the content in a particular cell includes text, and wherein the text is displayable in a first width and a second width.

33. The memory medium of claim 32,
wherein the first width and the second width represent the minimum and maximum possible widths for said particular cell.

34. The memory medium of claim 25,
wherein the display table description comprises a markup language table description.

35. The memory medium of claim 25,
wherein the display table description comprises a hypertext markup language (HTML) table description.

36. The memory medium of claim 25,
wherein said inspecting and said apportioning are implemented in a small footprint device.

* * * * *